(12) United States Patent
Shin et al.

(10) Patent No.: US 12,365,392 B2
(45) Date of Patent: Jul. 22, 2025

(54) ROOF REINFORCEMENT STRUCTURE OF VEHICLE BODY

(71) Applicants: Hyundai Motor Company, Seoul (KR); Kia Corporation, Seoul (KR)

(72) Inventors: Joonghyun Shin, Hwaseong-si (KR); Chulhee Heo, Hwaseong-si (KR); Dae Seung Kim, Suwon-si (KR); Heedae Oh, Suwon-si (KR); Jung Jong Chun, Seoul (KR); Minsoo Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 304 days.

(21) Appl. No.: 17/988,248

(22) Filed: Nov. 16, 2022

(65) Prior Publication Data

US 2023/0391404 A1 Dec. 7, 2023

(30) Foreign Application Priority Data

Jun. 2, 2022 (KR) .................. 10-2022-0067358

(51) Int. Cl.
*B62D 25/06* (2006.01)
*B62D 21/15* (2006.01)
*B62D 25/02* (2006.01)
*B62D 25/04* (2006.01)
*B62D 27/02* (2006.01)

(52) U.S. Cl.
CPC ............ *B62D 25/06* (2013.01); *B62D 21/15* (2013.01); *B62D 25/02* (2013.01); *B62D 27/023* (2013.01)

(58) Field of Classification Search
CPC ........ B62D 25/04; B62D 25/06; B62D 25/02; B62D 21/15; B62D 21/157; B62D 27/023
USPC ................ 296/210, 23.01, 3, 29, 30, 193.06
See application file for complete search history.

(56) References Cited

U.S. PATENT DOCUMENTS

| | | | | |
|---|---|---|---|---|
| 2,389,907 | A * | 11/1945 | Helmuth | B62D 23/005 29/469 |
| 3,652,124 | A * | 3/1972 | Tronville | E05B 77/00 296/146.12 |
| 5,018,781 | A * | 5/1991 | Kumasaka | B62D 25/06 296/210 |
| 5,271,687 | A * | 12/1993 | Holka | B62D 27/026 296/205 |
| 8,740,292 | B2 * | 6/2014 | Kishi | B62D 25/04 296/210 |

(Continued)

FOREIGN PATENT DOCUMENTS

CN 112046616 A * 12/2020

OTHER PUBLICATIONS

CN112046616 Text (Year: 2020).*

*Primary Examiner* — Dennis H Pedder
(74) *Attorney, Agent, or Firm* — SLATER MATSIL, LLP

(57) ABSTRACT

An embodiment is a roof reinforcement structure of a vehicle body, the roof reinforcement structure including a side complete assembly disposed on both sides of a vehicle body respectively, a front roof rail assembly connecting the front of the side complete assemblies, a rear roof rail assembly connecting the rear of the side complete assemblies, and at least two spines disposed side by side to connect the front roof rail assembly and the rear roof rail assembly.

13 Claims, 13 Drawing Sheets

(56) References Cited

U.S. PATENT DOCUMENTS

| | | | |
|---|---|---|---|
| 2009/0212602 A1* | 8/2009 | Reed | B62D 25/04 |
| | | | 296/210 |
| 2010/0244497 A1* | 9/2010 | Honda | B62D 23/005 |
| | | | 296/205 |

* cited by examiner

ROOF REINFORCEMENT STRUCTURE OF VEHICLE BODY

CROSS-REFERENCE TO RELATED APPLICATIONS

This application claims priority to and the benefit of Korean Patent Application No. 10-2022-0067358 filed in the Korean Intellectual Property Office on Jun. 2, 2022, which application is incorporated herein by reference.

TECHNICAL FIELD

The present invention relates to a vehicle body reinforcement structure.

BACKGROUND

Recently, the vehicle industry is introducing a new concept of future mobility vision for realizing a human-centered and dynamic future city. One of these future mobility solutions is a PBV (Purpose Built Vehicle) as a purpose-based mobility.

A PBV is an environment-friendly vehicle based on an electric vehicle that provides a variety of customized services to users. The vehicle body of such a PBV is composed of an under body (also referred to as a rolling chassis or skateboard in the industry) and an upper body assembled to the under body.

Here, the upper body may be configured in various forms according to the type of customized service of the PBV. For example, the PBV has only one door in front of the vehicle, and the door is not applied to the passenger seat, so that the vehicle body may be configured more economically.

However, if the door is not applied to the passenger seat and a door, for example, a sliding door, is applied to the rear of the passenger seat, the positions of the B pillars of the driver's seat and the passenger seat may be different, and in that case, the annular structure by the lateral direction roof rail application becomes difficult.

The above information disclosed in this background section is only for enhancement of understanding of the background of the invention, and therefore it may contain information that does not form the prior art that is already known to a person of ordinary skill in the art.

SUMMARY

The present invention relates to a vehicle body reinforcement structure. More particularly, the present invention relates to a roof reinforcement structure of a vehicle body that enhances the strength of the upper configuration of the vehicle body.

The present invention has been made in an effort to provide a roof reinforcement structure of the vehicle body that enhances the strength of the upper configuration of the vehicle body.

A roof reinforcement structure of a vehicle body according to an exemplary embodiment of the present invention may include a side complete assembly disposed on both sides of a vehicle body respectively, a front roof rail assembly connecting the front of the side complete assemblies, a rear roof rail assembly connecting the rear of the side complete assemblies, and at least two spines disposed side by side to connect the front roof rail assembly and the rear roof rail assembly.

Each of the front roof rail assembly and the rear roof rail assembly may include a roof rail body connected to the side complete assembly, and a roof rail bracket connected to the roof rail body to form a connection insert, and the spine may be inserted into the connection insert.

A concave forming portion may be formed on the roof rail body, and the roof rail bracket may form the connection insert together with the concave forming portion.

The roof rail body may include a roof rail upper in which the concave forming portion is formed, and a roof rail lower connected with the roof rail upper to form a rail closed cross-section.

The roof reinforcement structure of a vehicle body according to an exemplary embodiment of the present invention may further include at least one rib connecting the spine and the side complete assembly.

The rib may connect the pillars formed in the side complete assembly, respectively and the spine.

The rib may include a connection protrusion protruded to the inner end portion thereof to surround at least a portion of the spine.

The side complete assembly on both sides may include at least one pillar formed in the height direction of the vehicle body, respectively, and the roof reinforcement structure may further include a pillar lower bracket connecting the pillar and the outer end of the rib.

The pillar lower bracket may include a vertical portion that surrounds the pillar, and a horizontal portion that is bent from the vertical portion to support the rib.

The roof reinforcement structure of a vehicle body according to an exemplary embodiment of the present invention may further include a pillar upper bracket surrounding the upper portion of the side complete assembly and the outer end of the rib.

The pillar upper bracket may include an upper bracket body portion surrounding the rib, an upper bracket body flange connected with the horizontal portion, and a side flange connected with the upper portion of the side complete assembly.

At least one pillar of the side complete assembly on both sides may be disposed in a position that is not symmetrical in the length direction of the vehicle body.

The side complete assembly and the front roof rail assembly may form a front closed area together with a front cowl member connecting the side complete assemblies.

The side complete assembly and the rear roof rail assembly may form a rear closed area together with a transverse member connecting the side complete assemblies.

The roof reinforcement structure of a vehicle body according to an exemplary embodiment of the present invention may further include an inner rib connecting the at least two spines.

According to the roof reinforcement structure of the vehicle body according to an exemplary embodiment of the present invention, it is possible to respond to the asymmetry of the pillar with a simple structure.

According to the roof reinforcement structure of the vehicle body according to an exemplary embodiment of the present invention, it is easy to mount various parts for occupant convenience, for example, a display device etc.

In addition, the effects obtainable or predicted by the embodiments of the present invention are to be disclosed directly or implicitly in the detailed description of the embodiments of the present invention. That is, various effects predicted according to an exemplary embodiment of the present invention will be disclosed within a detailed description to be described later.

BRIEF DESCRIPTION OF THE DRAWINGS

Since these drawings are for reference in explaining an exemplary embodiment of the present invention, the technical idea of the present invention should not be construed as being limited to the accompanying drawings.

DETAILED DESCRIPTION OF ILLUSTRATIVE EMBODIMENTS

Figure 1:
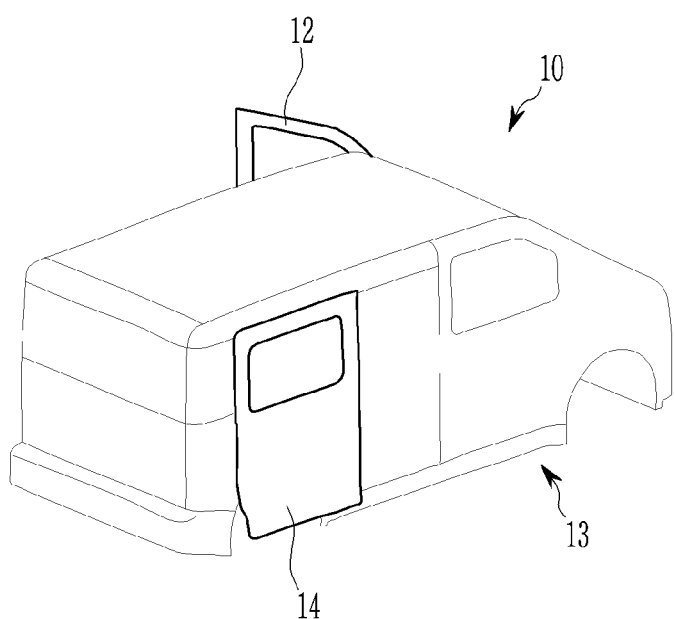
FIG. 1 is a perspective view of the vehicle body to which a roof reinforcement structure of a vehicle body according to an exemplary embodiment of the present invention may be applied.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly explain the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to that shown in the drawings, and the thickness is enlarged to clearly express various parts and regions.

In addition, in the following detailed description, the names of the components are divided into first, second, and the like to distinguish them in the same relationship, and the order is not necessarily limited in the following description.

Throughout the specification, when a part includes a certain component, it means that other components may be further included, rather than excluding other components, unless otherwise stated.

In addition, terms such as part or means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

An exemplary embodiment of the present invention will hereinafter be described in detail with reference to the accompanying drawings.

FIG. 1 is a perspective view of the vehicle body to which a roof reinforcement structure of a vehicle body according to an exemplary embodiment of the present invention may be applied.

Referring to FIG. 1, a vehicle body 10 of which a roof reinforcement structure according to an exemplary embodiment of the present invention may be applied includes a front door 12, and a sliding door 14 may be mounted to an opposite direction in which the front door 12 is mounted.

The vehicle body 10 may be a doorless vehicle body 10 without a door on the front passenger seat 13 of the front of the sliding door 14.

The side of the passenger seat 13 of the front has no door and the sliding door 14 is mounted, so the left and right sides of the vehicle may have an asymmetric structure.

In the drawing, it is shown that the front door 12 of the vehicle body 10 is disposed on the left side, and the sliding door 14 is disposed on the right side, but is not limited thereto, and vice versa.

Figure 2:
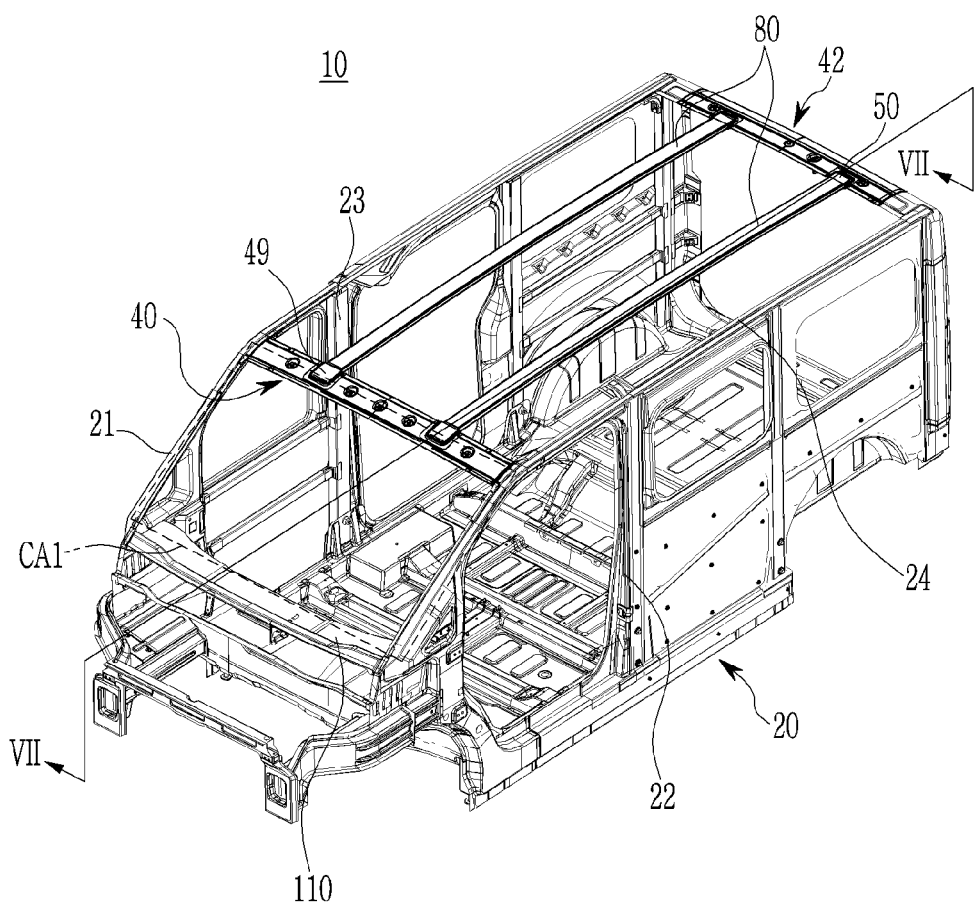
FIG. 2 and FIG. 3 is a partial perspective view of the roof reinforcement structure of the vehicle body according to an exemplary embodiment of the present invention.
Figure 3:
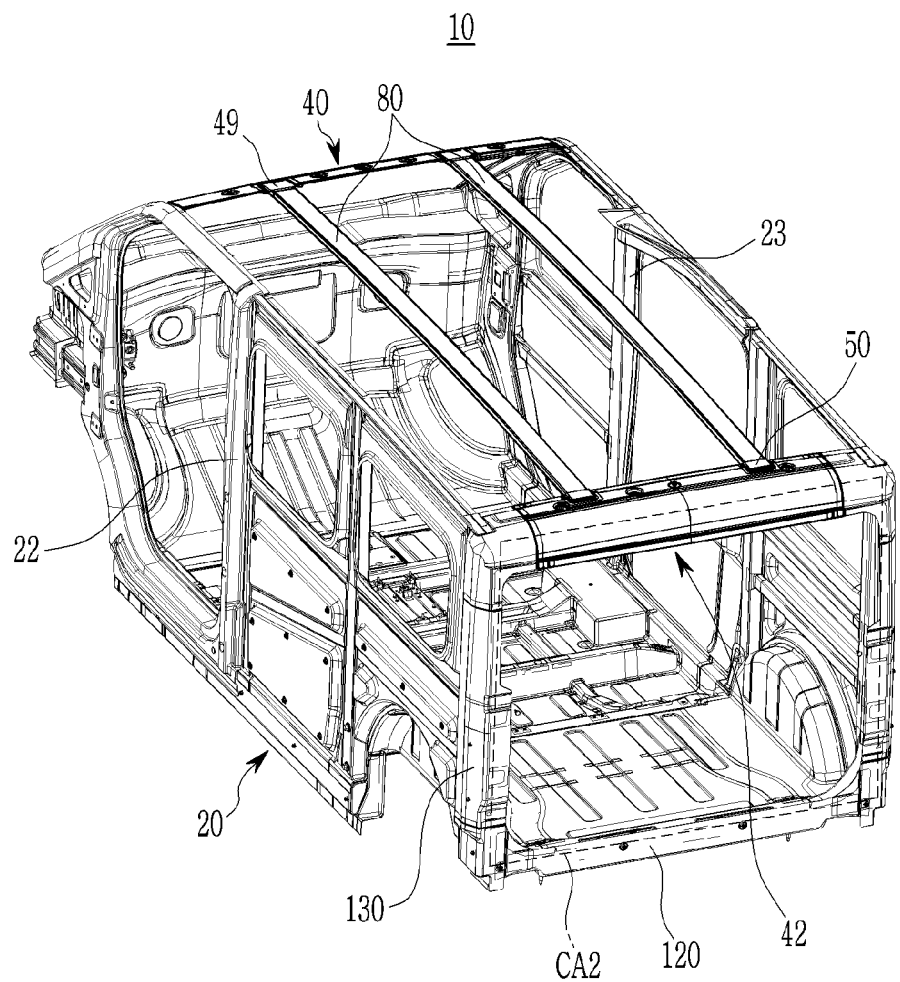
Figure 4:
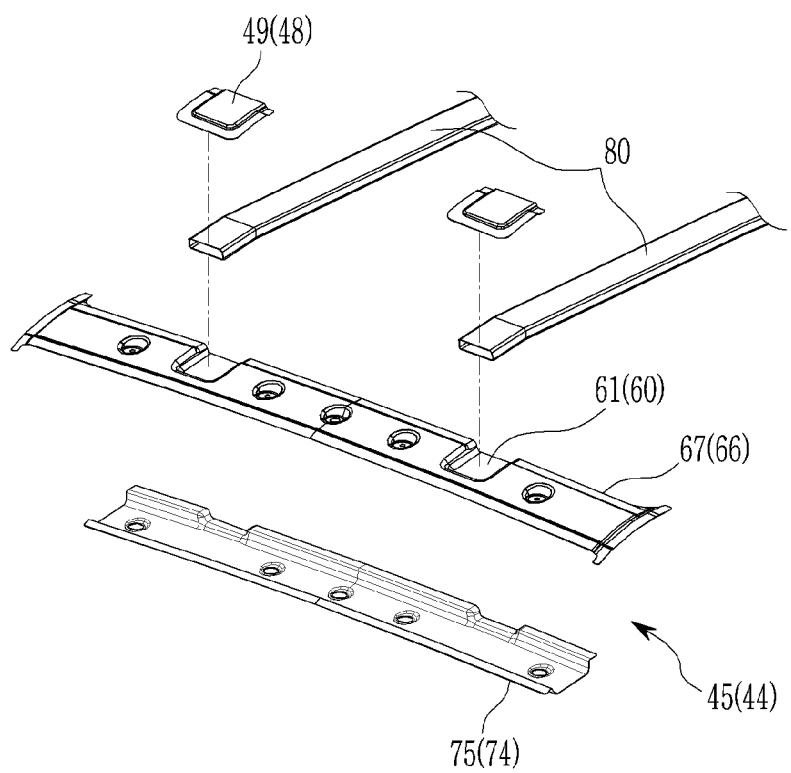
FIG. 4 is an exploded perspective view of a front roof rail body and a spine that may be applied to the roof reinforcement structure of the vehicle body according to an exemplary embodiment of the present invention.

FIG. 2 and FIG. 3 is a partial perspective view of the roof reinforcement structure of the vehicle body according to an exemplary embodiment of the present invention, and FIG. 4 is an exploded perspective view of a front roof rail body and a spine that may be applied to the roof reinforcement structure of the vehicle body according to an exemplary embodiment of the present invention.

Figure 5:
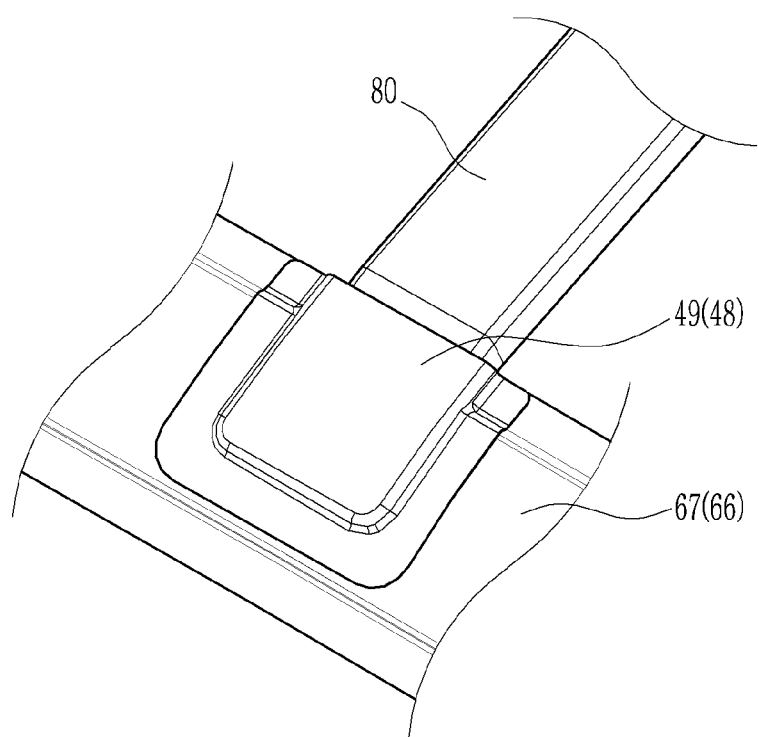
FIG. 5 and FIG. 6 is a perspective view of the front roof rail body and the spine that may be applied to the roof reinforcement structure of the vehicle body according to an exemplary embodiment of the present invention.
Figure 6:
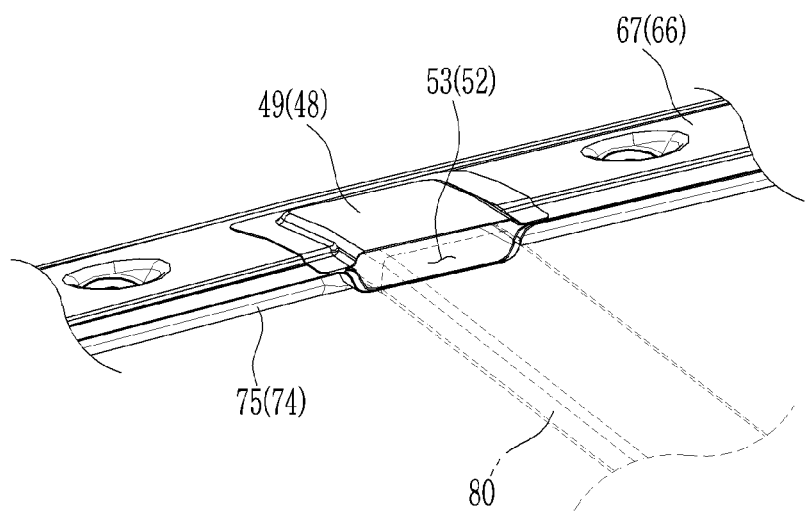
Figure 7:
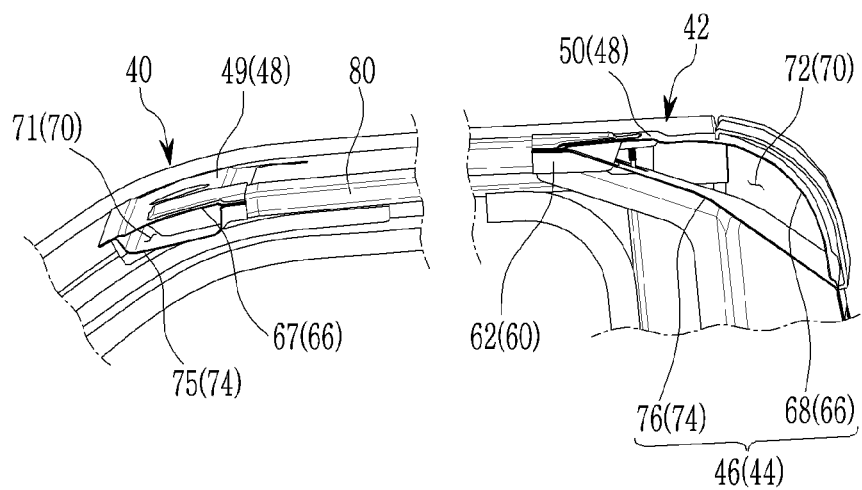
FIG. 7 is a cross-section perspective view along line VII-VII of FIG. 2.

FIG. 5 and FIG. 6 is a perspective view of the front roof rail body and the spine that may be applied to the roof reinforcement structure of the vehicle body according to an exemplary embodiment of the present invention.

Referring to FIG. 1 to FIG. 6, the roof reinforcement structure of the vehicle body according to an exemplary embodiment of the present invention may include a side complete assembly 20 disposed on both sides of the vehicle body 10, respectively, a front roof rail assembly 40 that connects the front of the side complete assemblies 20, a rear roof rail assembly 42 connecting the rear of the side complete assemblies 20, and at least two spines 80 disposed side by side to connect the front roof rail assembly 40 and the rear roof rail assembly 42.

Although the drawing shows that the spine 80 is disposed with two, but is not limited thereto, three or more spines may be mounted.

The side complete assembly 20 and the front roof rail assembly 40 may form a front closed area CA1 together with a front cowl member 110 connecting the side complete assemblies 20.

For example, as shown in FIG. 2, since a front pillar or an A pillar 21 mounted on both sides of the front of the vehicle body 10, the front cowl member 110 and the front roof rail assembly 40 form the front closed area CA1, and the at least two spines 80 support the front roof rail assembly 40, so that the front strength of the vehicle body may be enhanced.

The side complete assembly 20 and the rear roof rail assembly 42 may form a rear closed area CA2 together with a transverse member 120 connecting the side complete assemblies 20.

For example, as shown in FIG. 3, since the rear side member 130 mounted on both rear sides of the vehicle body 10, the transverse member 120, and the rear roof rail assembly 42 form the rear closed area CA2, and the at least two spines 80 support the rear roof rail assembly 42, so that the rear strength of the vehicle body may be enhanced.

Referring to FIG. 4 to FIG. 7, each of the front roof rail assembly 40 and the rear roof rail assembly 42 includes a roof rail body 44 connected to the side complete assembly 20, and a roof rail bracket 48 connected to the roof rail body 44 to form a connection insert 52, and the spine 80 may be inserted into the connection insert 52.

In addition, a concave forming portion 60 may be formed on the roof rail body 44, and the roof rail bracket 48 may form the connection insert 52 together with the concave forming portion 60.

The roof rail body 44 may include a roof rail upper 66 in which the concave forming portion 60 is formed, and a roof rail lower 74 connected with the roof rail upper 66 to form a rail closed cross-section 70.

For example, the front roof rail assembly 40 includes a front roof rail body 45 connected to the side complete assembly 20, and a front roof rail bracket 49 connected with the front roof rail body 45 to form a front connection insert 53, and the spine 80 may be inserted into the front connection insert 53.

In addition, a front concave forming portion 61 may be formed on the front roof rail body 45, and the front roof rail bracket 49 may form the front connection insert 53 together with the front concave forming portion 61.

The front roof rail body 45 may include a front roof rail upper 67 in which the front concave forming portion 61 is formed, and a front roof rail lower 75 connected with the front roof rail upper 67 to form a front rail closed cross-section 71.

For example, the rear roof rail assembly 42 may be connected with the spine 80 in a configuration similar to the front roof rail assembly 40.

That is, the rear roof rail assembly 42 includes a rear roof rail body 46 connected to the side complete assembly 20, and a rear roof rail bracket 50 connected with the rear roof rail body 46 to form a rear connection insert (not shown) and the spine 80 may be inserted into the rear connection insert.

In addition, a rear concave forming portion 62 may be formed on the rear roof rail body 46, and the rear roof rail bracket 50 may form the rear connection insert together with the rear concave forming portion 62.

The rear roof rail body 46 may include a rear roof rail upper 68 of which a rear concave forming portion 62 is formed thereto, and a rear roof rail lower 76 connected with the rear roof rail upper 68 to form a rear rail closed cross-section 72.

In the structure, the double spine 80 disposed in the longitudinal direction of the vehicle body 10 and the front roof rail assembly 40 and the rear roof rail assembly 42 disposed in the lateral direction of the vehicle body 10 have cross-sections sufficiently overlapped, so connectivity characteristic may be enhanced.

Since the roof rail bracket 48 is connected to the roof rail upper 66 to form the connection insert 52, and the spine 80 is inserted to the connection insert 52, so that the spine 80 may be more securely connected to the front roof rail assembly 40 and the rear roof rail assembly 42 respectively.

In addition, the concave forming portion 60 may enhance the strength of the roof rail body 44 by its curved shape, and the concave forming portion 60 forms the connection insert 52 together with the roof rail bracket 48 so that the spine 80 may be firmly connected.

For example, the spine 80 may be inserted into the concave forming portion 60, and the roof rail bracket 48 may be connected to connect the spine 80 and the front roof rail assembly 40 and the rear roof rail assembly 42.

As another example, the spine 80 and the roof rail bracket 48 may be connected, and the spine 80 may be inserted into the concave forming portion 60 to connect the spine 80 and the front roof rail assembly 40 and the rear roof rail assembly 42.

During the assemble process, for example, the spine 80 and the roof rail bracket 48 may be welded, and the spine 80 and the roof rail bracket 48 may be connected to the roof rail upper 66 using welding and adhesive.

The width direction strength of the vehicle body 10 may be increased by connecting the roof rail upper 66 and the roof rail lower 74 to form the front rail closed cross-section 71 and the rear rail closed cross-section 72, respectively.

Figure 8:
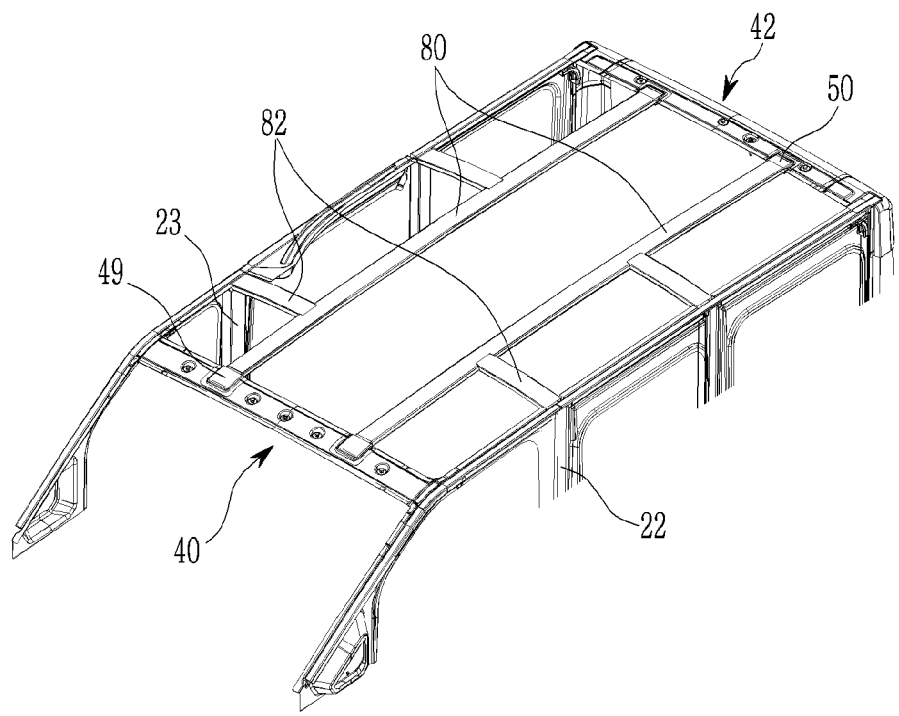
FIG. 8 is a partial perspective view of the roof reinforcement structure of the vehicle body according to an exemplary embodiment of the present invention.
Figure 9:
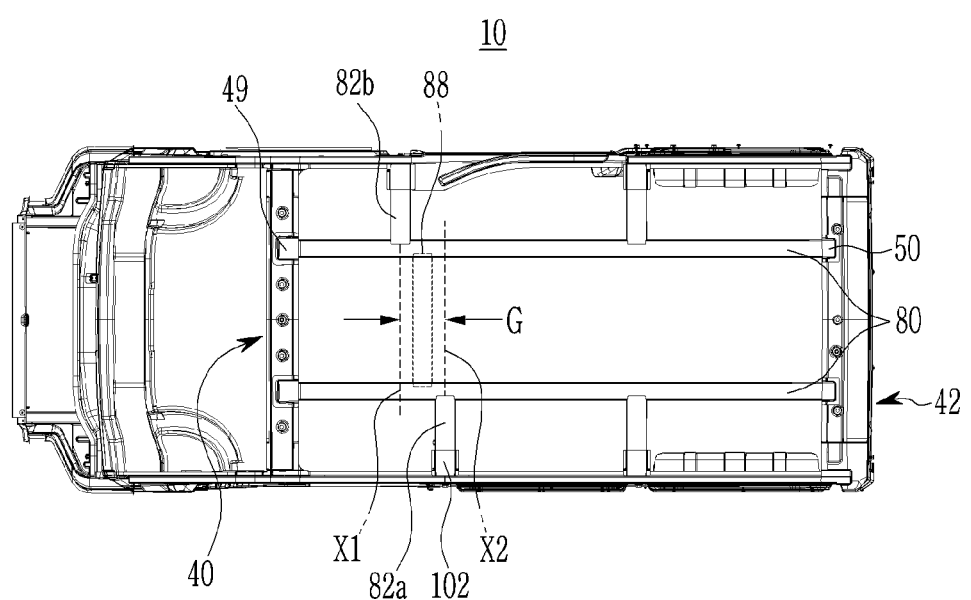
FIG. 9 is a top plan view of the roof reinforcement structure of the vehicle body according to an exemplary embodiment of the present invention.

FIG. 8 is a partial perspective view of the roof reinforcement structure of the vehicle body according to an exemplary embodiment of the present invention, and FIG. 9 is a top plan view of the roof reinforcement structure of the vehicle body according to an exemplary embodiment of the present invention.

Figure 10:
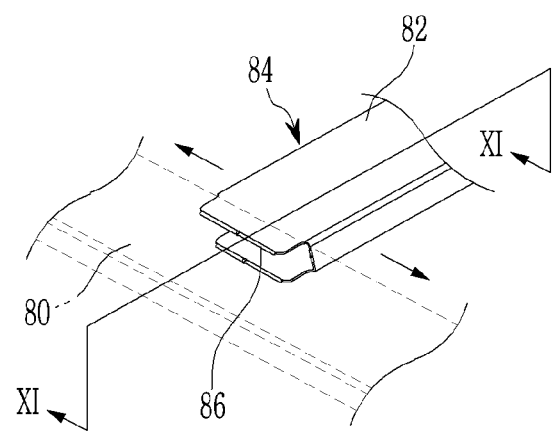
FIG. 10 is a perspective view showing a connection of the spine and a rib that may be applied to the roof reinforcement structure of the vehicle body according to an exemplary embodiment of the present invention.
Figure 11:
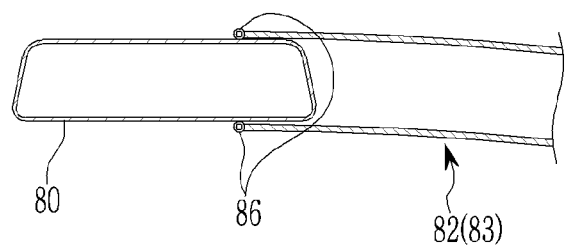
FIG. 11 is a cross-sectional view along line XI-XI of FIG. 10.

FIG. 10 is a perspective view showing a connection of the spine and a rib that may be applied to the roof reinforcement structure of the vehicle body according to an exemplary embodiment of the present invention, and FIG. 11 is a cross-sectional view along line XI-XI of FIG. 10.

Referring to FIG. 8 to FIG. 11, the roof reinforcement structure of the vehicle body according to an exemplary embodiment of the present invention may further include at least one rib 82 connecting the spine 80 and the side complete assembly 20.

The rib 82 may connect the pillars 22, and 23 formed in the side complete assembly 20, respectively and the spine 80.

The rib 82 may include a connection protrusion 86 protruded to the inner end portion 84 thereof to surround at least a portion of the spine 80.

The connection protrusion 86 of the rib 82 may secure connect strength as a structure surrounding the spine 80, and the position of the rib 82 may be variably disposed along the length direction of the spine 80.

That is, the mounting position of the rib 82 may be adjusted so that the roof reinforcement structure of the vehicle body according to an exemplary embodiment of the present invention is commonly applicable to various types of vehicle body.

Figure 12:
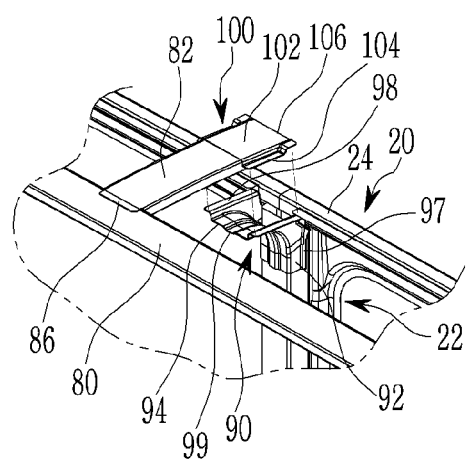
FIG. 12 is an exploded perspective view of a side complete assembly and a rib that may be applied to the roof reinforcement structure of the vehicle body according to an exemplary embodiment of the present invention.
Figure 13:
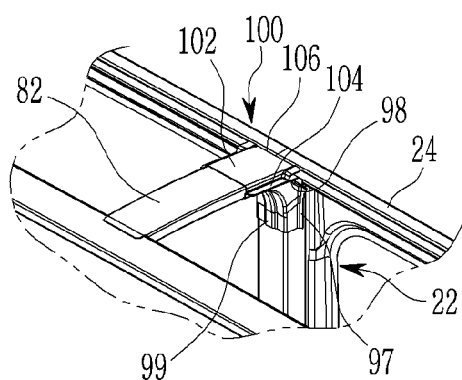
FIG. 13 is a perspective view of the side complete assembly and the rib that may be applied to the roof reinforcement structure of the vehicle body according to an exemplary embodiment of the present invention.

FIG. 12 is an exploded perspective view of a side complete assembly and a rib that may be applied to the roof reinforcement structure of the vehicle body according to an exemplary embodiment of the present invention, and FIG. 13 is a perspective view of the side complete assembly and the rib that may be applied to the roof reinforcement structure of the vehicle body according to an exemplary embodiment of the present invention.

Referring to FIG. 8, FIG. 12 and FIG. 13, the side complete assembly 20 on both sides may include at least one pillar 22 and 23 formed in the height direction of the vehicle body 10, respectively.

Based on the pillar 22 mounted on the front door 12 of the vehicle body 10, the roof reinforcement structure of the vehicle body according to an exemplary embodiment of the present invention may further include a pillar lower bracket 90 connecting the pillar 22 and the outer end of the rib 82.

The pillar lower bracket 90 may include a vertical portion 92 that surrounds the pillar 22, and a horizontal portion 94 that is bent from the vertical portion 92 to support the rib 82.

The pillar lower bracket 90 may include a vertical flange 97 that is curved in the vertical portion 92 to connect with the pillar 22, and a horizontal flange 98 that is curved in the horizontal portion 94.

The vertical portion 92 and the horizontal portion 94 may be bent so that its strength may be increased, and the lower body protrude part 99 may be formed to further increase its strength.

The roof reinforcement structure of the vehicle body 10 according to an exemplary embodiment of the present invention may further include a pillar upper bracket 100 surrounding the upper portion of the side complete assembly 20 and the outer end of the rib 82.

The pillar upper bracket 100 may include an upper bracket body portion 102 surrounding the rib 82, an upper bracket body flange 104 connected with the horizontal portion 94, and a side flange 106 connected with the upper portion of the side complete assembly 20.

For example, the upper bracket body flange 104 may be connected with the rib 82 by welding with the horizontal flange 98.

At least one pillar 22, and 23 of the side complete assembly 20 on both sides may be disposed in a position that is not symmetrical in the length direction of the vehicle body 10.

For example, referring to FIG. 8 and FIG. 9, there may be asymmetrical difference G between position X1 of pillar 23 in the passenger seat direction and position X2 of pillar 22 in the driver's seat direction.

Here, it is shown that the position X1 of the pillar 23 in the passenger seat direction is positioned at the front of the vehicle body 10 rather than the position X2 of the pillar 22 in the driver's seat direction, but is not limited thereto.

Even if the positions of the ribs 82a, and 82b connected to each of the pillars 22, and 23 are not symmetrical, the spine 80 and the front roof rail assembly 40 and the rear roof rail assembly 42 are connected in a closed shape to the vehicle body 10, so that the roof structure may be enhanced.

In addition, the roof reinforcement structure of the vehicle body 10 according to an exemplary embodiment of the present invention may further include an inner rib 88 connecting the at least two spines 80.

The inner rib 88 is disposed between the width direction positions X1, and X2 of each of the pillars 22, and 23, for example, to connect the spines 80 to increase the width direction strength of the vehicle body 10.

However, the mount position of the inner rib 88 is not limited thereto, and it may be used as a structure for mounting other structures, for example, displays for indoor occupants.

Through this, the convenience of occupant may be improved.

As described above, according to the roof reinforcement structure of the vehicle body according to an exemplary embodiment of the present invention, it is possible to respond to the asymmetry of the pillars with a simple structure.

According to the roof reinforcement structure of the vehicle body according to an exemplary embodiment of the present invention, it is easy to mount various parts for occupant convenience, for example, a display device etc.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

| <Description of symbols> | |
|---|---|
| 10: vehicle body | 12: front door |
| 13: passenger seat | 14: sliding door |
| 20: side complete assembly | 21: front pillar |
| 22, 23: pillar | 24: side roof body |
| 40: front roof rail assembly | |
| 42: rear roof rail assembly | |
| 44: roof rail body | |
| 45: front roof rail body | |
| 46: rear roof rail body | 48: roof rail bracket |
| 49: front roof rail bracket | |
| 50: rear roof rail bracket | |
| 52: connection insert | 53: front connection insert |
| 60: concave forming portion | 61: front concave forming portion |
| 62: rear concave forming portion | 66: roof rail upper |
| 67: front roof rail upper | |
| 68: rear roof rail upper | |
| 70: rail closed cross-section | 71: front rail closed cross-section |
| 72: rear rail closed cross-section | 74: roof rail lower |
| 75: front roof rail lower | |
| 76: rear roof rail lower | |
| 80: spine | 82: rib |
| 84: inner end portion | 86: connection protrusion |
| 83: inner rib | 90: pillar lower bracket |
| 92: vertical portion | 94: horizontal portion |
| 97: vertical flange | 98: horizontal flange |
| 99: lower body protrude part | 100: pillar upper bracket |
| 102: upper bracket body portion | |
| 104: upper bracket body flange | |
| 106: side flange | 110: front cowl member |
| 120: transverse member | 130: rear side member |

What is claimed is:

1. A roof reinforcement structure of a vehicle body, the roof reinforcement structure comprising:
    a side complete assembly disposed on both sides of the vehicle body respectively, wherein at least one pillar of the side complete assembly on both sides is disposed in a position that is not symmetrical in a length direction of the vehicle body;
    a front roof rail assembly connecting a front of the side complete assemblies;
    a rear roof rail assembly connecting a rear of the side complete assemblies;
    at least two spines disposed side by side to connect the front roof rail assembly and the rear roof rail assembly;
    an inner rib connecting the at least two spines, wherein the inner rib is disposed between width direction positions of each of the pillars which are not symmetrical; and
    at least one rib connecting a spine of the at least two spines and the side complete assembly, wherein the at least one rib connects pillars in the side complete assembly and the spine.

2. The roof reinforcement structure of claim 1, wherein each of the front roof rail assembly and the rear roof rail assembly includes:

a roof rail body connected to the side complete assembly; and a roof rail bracket connected to the roof rail body to form a connection insert, wherein a spine of the at least two spines is inserted into the connection insert.

3. The roof reinforcement structure of claim 2, wherein a concave forming portion is formed on the roof rail body, and the roof rail bracket forms the connection insert together with the concave forming portion.

4. The roof reinforcement structure of claim 3, wherein the roof rail body comprises:

a roof rail upper in which the concave forming portion is formed; and a roof rail lower connected with the roof rail upper to form a rail closed cross-section.

5. The roof reinforcement structure of claim 1, wherein the at least one rib comprises:

a connection protrusion protruded to an inner end portion thereof to surround at least a portion of the spine.

6. The roof reinforcement structure of claim 1, wherein the side complete assembly on both sides comprises at least one pillar disposed in a height direction of the vehicle body, respectively, and wherein the roof reinforcement structure further comprises a pillar lower bracket connecting the pillar and an outer end of the rib.

7. The roof reinforcement structure of claim 6, wherein the pillar lower bracket comprises:

a vertical portion that surrounds the pillar; and a horizontal portion that is bent from the vertical portion to support the rib.

8. The roof reinforcement structure of claim 7, further comprising:

a pillar upper bracket surrounding an upper portion of the side complete assembly and the outer end of the rib.

9. The roof reinforcement structure of claim 8, wherein the pillar upper bracket comprises:

an upper bracket body portion surrounding the rib;

an upper bracket body flange connected with the horizontal portion; and a side flange connected with the upper portion of the side complete assembly.

10. The roof reinforcement structure of claim 1, wherein the side complete assembly and the front roof rail assembly form a front closed area together with a front cowl member connecting the side complete assemblies.

11. The roof reinforcement structure of claim 1, wherein the side complete assembly and the rear roof rail assembly form a rear closed area together with a transverse member connecting the side complete assemblies.

12. A vehicle body comprising:

a roof reinforcement structure comprising:

a side complete assembly disposed on both sides of the vehicle body respectively;

a front roof rail assembly connecting a front of the side complete assemblies;

a rear roof rail assembly connecting a rear of the side complete assemblies;

at least two spines disposed side by side to connect the front roof rail assembly and the rear roof rail assembly;

an inner rib connecting the at least two spines; and at least one rib connecting a spine of the at least two spines and the side complete assembly, wherein:

the at least one rib connects pillars in the side complete assembly and the spine, and the inner rib is disposed between width direction positions of each of the pillars which are not symmetrical.

13. The vehicle body of claim 12, wherein at least one pillar of the side complete assembly on both sides is disposed in a position that is not symmetrical in a length direction of the vehicle body.

* * * * *